United States Patent [19]
Ryan

[11] Patent Number: 4,963,122
[45] Date of Patent: Oct. 16, 1990

[54] CONTINUOUSLY VARIABLE DIFFERENTIAL

[75] Inventor: Thomas B. Ryan, Webster, N.Y.

[73] Assignee: The Gleason Works, Rochester, N.Y.

[21] Appl. No.: 62,942

[22] PCT Filed: Jun. 4, 1987

[86] PCT No.: PCT/US87/01330
§ 371 Date: Jun. 4, 1987
§ 102(e) Date: Jun. 4, 1987

[87] PCT Pub. No.: WO88/09886
PCT Pub. Date: Dec. 15, 1988

[51] Int. Cl.[5] .............................. F16H 59/46
[52] U.S. Cl. ........................ 475/184; 475/186; 475/192; 180/76
[58] Field of Search ............... 475/19, 26, 220, 254, 475/184, 186, 192; 74/650; 180/76, 6.24

[56] References Cited

U.S. PATENT DOCUMENTS

| | | | |
|---|---|---|---|
| 1,063,244 | 6/1913 | Dieterich | 475/26 |
| 3,299,744 | 1/1967 | Krans | 475/26 |
| 4,226,140 | 10/1980 | Gaasenbeek | 74/690 |
| 4,267,749 | 5/1981 | Chambers et al. | 74/690 |
| 4,535,651 | 8/1988 | Chambers | 74/711 |
| 4,572,015 | 2/1986 | Kemper | 475/26 X |
| 4,669,569 | 6/1987 | Suzuki et al. | 180/249 |
| 4,671,136 | 6/1987 | Katayama | 74/710.5 |
| 4,671,373 | 6/1987 | Sigl | 180/76 |
| 4,681,180 | 7/1987 | Oyama et al. | 74/650 X |
| 4,741,407 | 3/1988 | Torii et al. | 74/650 X |
| 4,790,404 | 12/1988 | Naito | 180/197 |

FOREIGN PATENT DOCUMENTS

| | | |
|---|---|---|
| 222138 | 4/1908 | Fed. Rep. of Germany . |
| 0071481 | 3/1988 | Japan ................................... 180/76 |
| WO86/0554 | 9/1986 | PCT Int'l Appl. . |

OTHER PUBLICATIONS

"On the Mechanical Efficiency of Differential Gearing", Journal of Mechanisms, Transmissions and Automation in Design, ASME, 84-DET-102.
"Traction Drives Roll Up Impressive Gains", Frank Najlepszy, Machine Design/Oct. 24, 1985, pp. 68-75.
"CVT Blends Manual and Automatic Ideas", Machine Design/Sep. 11, 1986, p. 52.

*Primary Examiner*—Dirk Wright
*Attorney, Agent, or Firm*—Ralph E. Harper; Robert L. McDowell

[57] ABSTRACT

A continuously variable differential (10) uses a continuously variable transmission (50) that is rotated by drive torque and controlled to vary the speed ratio between its outputs. These, which previously transmitted power through the transmission, are connected with a pair of drive shafts such as opposed drive axles (17 and 18) that rotate with the transmission under drive power. Differentiation between the shafts transmits through the transmission via variable speed ratios that control the moment arms, mechanical advantages, and torque bias ratios. This arrangement allows the torque to be distributed according to sensed vehicle conditions. It can apply more torque to a wheel retaining traction when its opposite wheel slips, and it can apply a larger portion of the torque to wheels bearing more weight or to a faster rotating wheel on an outside of a curve.

20 Claims, 1 Drawing Sheet

CONTINUOUSLY VARIABLE DIFFERENTIAL

BACKGROUND

Although there have been many schemes for varying the torque bias ratio between drive axles connected by a differential, all of them have experienced problems; and the open differential is still the most popular one in use. This has a relatively efficient torque transmission train and a low bias ratio, which works well so long as both wheels have traction. The low bias ratio makes it easy to get stuck if one wheel loses traction, however, because not much torque can be transmitted to the opposite wheel.

The many attempts to overcome this have mostly involved reducing the efficiency of the interaxle torque transmission through the differential. This increases the bias ratio and increases the torque that can be transmitted to one wheel when another one slips. A high and constant bias ratio can cause other problems, however. Since nearly all differentials have an interaxle speed ratio of −1 (meaning that axles rotating relative to each other do so in an opposite direction at the same speed), and since all differentials have efficiencies of less than 100%, those with a −1 speed ratio always apply a proportionally larger amount of torque to the slower rotating axle on the inside of a curve. Differentials with a high bias ratio exaggerate the greater proportion of torque applied to the inside wheel and thus create an under steer moment, urging the vehicle straight ahead while it is turning.

Many proposals have also been made for differentials having interaxle drive efficiencies that can be varied during operation. Fluid couplings and friction clutches are among the possibilities. Although achieving some success in spite of complexity and reliability problems, none of these (nor any other differential with a −1 speed ratio) can apply a proportionally larger amount of torque to the faster rotating axle on the outside of a curve. This can be desirable because the vehicle weight shifts to the outside wheel on a curve, and the more heavily weighted wheel has more traction with which to exert the available torque.

It has also been proposed in U.S. Pat. No. 4,535,651 (CHAMBERS) to vary speed ratios of a differential by means of multiple gear trains that can be engaged alternatively to increase the torque to a slower moving axle if necessary. This may help tractors and slow speed vehicles get a better traction grip, but it would make a high speed automobile unstable to abruptly change its axle speed ratios. Also, shifting gear trains is cumbersome and expensive and, as proposed by Chambers, is still not capable of providing more torque to a faster rotating axle traveling the outside of a curve.

Also proposed in DE, C, 222,138 (LUDWIG MARIA DIETERICH) is a continuously variable transmission which is mounted in a vehicle drive line between an input shaft and two rear drive axles. The transmission provides for controlling speed ratios between the input shaft and each of the drive axles. This effects a steering drive of the type more common in bulldozers and tanks. However, in doing so, the usual function of a differential to permit the output shafts to freely "differentiate" (i.e., rotate at any speed difference between the two which may be required to accommodate a variety of operating conditions including different size drive wheels or uneven distances of travel between drive axles) is lost. Although Dieterich also proposes to control this steering effect by special linkages to a front steering axle, many more variations in addition to the front steering axle position affect the required rotational speeds of the rear drive axles, and any resistance forces active at the rear drive wheels which tend to rotate the drive axles at a speed difference other than the exact difference being controlled would produce undesirable torque "windup" between the axles.

I have discovered a way of transmitting drive torque through a differential to a pair of drive axles in a freely variable manner that allows more of the torque to be sent to the faster rotating axle on the outside of a curve and generally allows the torque distribution to be controlled in response to vehicle driving conditions. My differential is thus able to achieve torque bias ratios not attainable with previous differentials that use torque transmission efficiencies to vary bias ratios. In creating new torque distribution possibilities, my differential allows vehicle suspension and steering design to take advantage of torque variation under different driving conditions such as turning, braking, varying weight distributions, and varying traction. Besides being usable between a pair of opposed axles, my differential can also distribute driving torque between front and rear axle pairs.

SUMMARY OF THE INVENTION

My differential varies the speed ratios used in transmitting torque to a pair of rotatable shafts serving as opposed drive axles or as torque distributors between axle pairs, and it accomplishes this by using a continuously variable transmission. Instead of the transmission being fixed in place and used to vary speed ratios between its input and its output, I connect these respectively to the shafts or axles and rotate the transmission with drive torque so that the whole transmission turns between the driven shafts. I then control variation of the transmission to vary the speed ratios used in transmitting the drive torque to the shafts or axles so that their mechanical advantages also vary. This allows controlled apportionment of the drive torque between axles when they rotate differentially in response to vehicle drive conditions. These can include axle acceleration, axle weight distribution, turning, velocity, engine braking, and possibly others. Information about vehicle drive conditions can be processed to control the variable speed ratios of the transmission to divide the torque between the drive axles according to the vehicle's needs. This can include applying more of the torque to a faster rotating axle on an outside of a curve, as well as more torque to an axle retaining traction when its opposite axle slips. It can also include applying more torque to one pair of axles that have better traction or bear more weight than another pair of axles that are more inclined to slip.

DRAWINGS

FIG. 1 is a partially schematic, cutaway elevational view of one embodiment of my continuously variable differential; and FIG. 2 is a cross-sectional view of the differential of FIG. 1, taken along the line 2—2 thereof.

DETAILED DESCRIPTION

Figure 1:
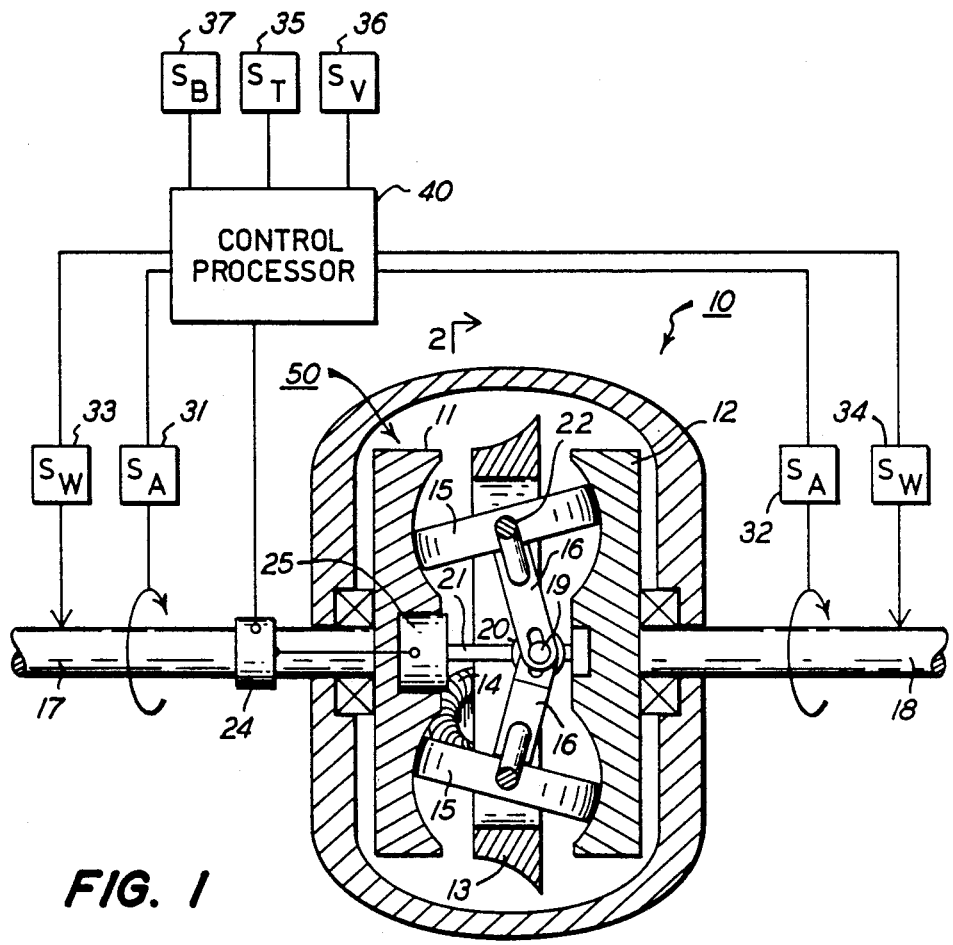

To achieve varying interaxle speed ratios within my continuously variable differential (CVD), I use a continuously variable transmission (CVT). These are intended to transmit power from a rotating input shaft to a variable speed output shaft, and they control the speed ratio between the two shafts. My CVD makes use of the speed ratio control of a CVT, but does not transmit power through the variable speed ratio path of the CVT. Instead, I connect opposite ends of the variable speed ratio path respectively to driven output shafts or axles and rotate the entire CVT with drive torque. This directly drives the shafts or axles, which are also free to rotate differentially via the speed ratio path at negative speed ratios that can be varied throughout a continuum by controlling the CVT. My CVD can differentiate between shafts that distribute torque to the front and rear axles of a four wheel drive vehicle, as well as divide the torque between a pair of opposed axles. The best way to explain my CVD, however, is in the familiar position of differentiating drive torque between opposed axles, and this function is assumed throughout the following explanation, unless otherwise specified.

Many continuously variable transmissions exist and operate in ways that make them suitable for my differential. Most of the available CVT's are traction drives that use balls, rollers, disks, cones, and other friction drive elements that can rotate at varying radii. Many of these are potentially suitable for use in my differential. The requirements include compact size, capability of being rotated as a whole, and ability to transmit drive torque to output elements that are oppositely rotatable. If the output elements of a CVT rotate in the same direction, one of them can be changed to negative by gearing.

Not all continuously variable transmissions are traction drives. One CVT under development uses variable duration electric pulses to change the speed ratio coupling between an input shaft and an output shaft. This, and any other CVT that can vary speed ratios and can be rotated between shafts or drive axles to accommodate their opposite rotation, can be selected for use in my differential. Size, ease of control, expense, and durability would be additional considerations.

From among the many available possibilities, I have chosen for illustration a traction drive CVT 50 using rollers 15 rotating between output plates 11 and 12 within continuously variable differential 10. As true of any CVT selected for differential use according to my invention, CVT 50 is rotated by drive torque, in this case applied to ring gear 13 by hypoid gear 14, although bevel gear, spur gear, worm gear, and other inputs are possible. Ring gear 13 forms a rotatable casing or housing carrying rollers 15, which revolve with drive torque and, by their frictional engagement with plates 11 and 12, rotate these as well. Plates 11 and 12, like the side gears of an open differential, are connected respectively with opposite drive axles 17 and 18, which rotate with the drive torque applied to plates 11 and 12 by revolving rollers 15. When my CVD 10 is used to distribute drive torque to front and rear axle pairs, shafts 17 and 18 become drive shafts to axle differentials, rather than opposed axles.

The angles of rollers 15 relative to plates 11 and 12 are changeable to vary the speed ratio between shafts 17 and 18. As schematically illustrated, arms 16 carrying rollers 15 are connected by a pivot pin 19 that is movable axially between plates 11 and 12. A nut 20, carrying pin 19, is mounted on a threaded rod 21 that is rotatable by motor 25. This moves nut 20 axially back and forth between plates 11 and 12 to change the location of pivot pin 19 and the angles of rollers 15 relative to plates 11 and 12.

As shown in FIG. 1, rollers 15 are angled to engage plate 11 at a minimum radius and plate 12 at a maximum radius. This makes the speed ratio of axle 17 to axle 18 a proportion of 3:2, for example, because three turns of plate 11 at the short radius of engagement of rollers 15 could be required for two revolutions of plate 12 at the longer radius of engagement of rollers 15. Since torque varies inversely with speed ratio, and is proportional to mechanical advantage or moment arm, the torque distribution to axles 17 and 18, when they rotate differentially, has a bias ratio of 2:3. When differential rotation occurs between axles 17 and 18, this bias ratio delivers more torque to axle 18 than to axle 17, for reasons such as axle 18 being on the outside of a curve, bearing more of the vehicle's weight, or maintaining traction while axle 17 slips. By rotating rod 21 with motor 25, the angles of rollers 15 can be reversed from the position of FIG. 1 to reverse the speed ratios and torque distributions and apply more differential torque to axle 17. For normal driving, nut 20 can be centered so that rollers 15 engage plates 11 and 12 at equal radii, making the speed ratio $-1$ between axles 17 and 18. The 3:2 speed ratio and 2:3 torque bias ratio is not an upper limit, and is merely an example; for speed ratios, and corresponding torque bias ratios, can vary throughout the range available from the particular CVT being used.

Figure 2:
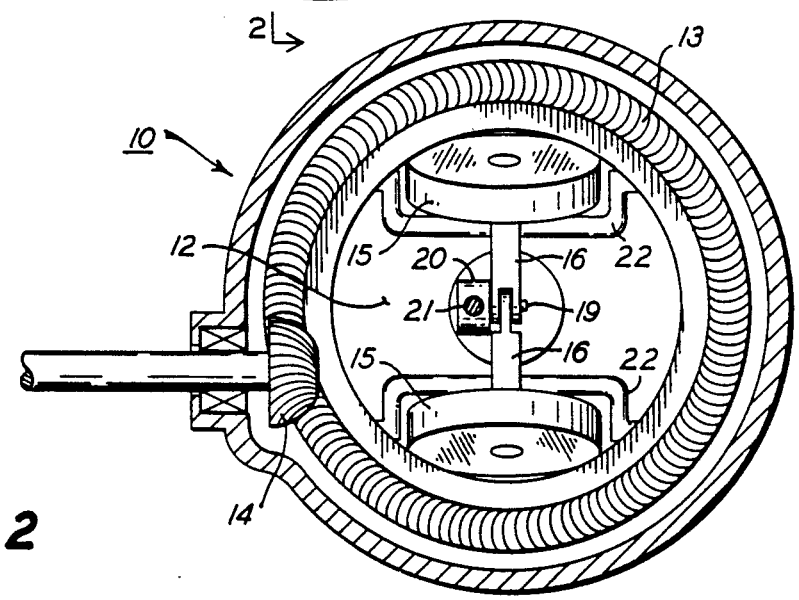

Supports 22 for the pivoting of rollers 15 within gear carriage 13 are schematically shown in FIG. 2. Many variations can be made on roller support, roller angle control mechanisms, and torque drive input; and when other CVT's are used, other variations become available.

A CVT arranged in my continuously variable differential 10 does not transmit power between an input and an output, as is normal for a CVT. Only torque is transmitted from input housing 13 via rollers 15 to output plates 11 and 12, since all these rotate together under drive power. It is only when differential rotation occurs between axles 17 and 18 that there is any counter rotation of plates 11 and 12, to transmit torque between axles. This happens through a relatively efficient torque train involving rollers 15 between plates 11 and 12; and with differentials having a fixed speed ratio of $-1$, this would produce a low torque bias ratio. But the speed ratio of CVT 50 is variable throughout a continuum by changing the axles of rollers 15. This inversely changes the radii of engagement rollers 15 with plates 11 and 12 for varying the moment arms and mechanical advantages of plates 11 and 12, thereby effecting differential torque distribution independently of axle speed. More torque is transmitted to the axle whose output plate is engaged at the larger radius by rollers 15, and unlike the multitude of differentials having a fixed interaxle speed ratio of $-1$, more torque can be applied by CVD 10 to the faster rotating axle on the outside of a curve.

Controlling the differential torque distribution with my CVD requires sensing vehicle drive conditions and varying speed ratio of CVT 50 rotating within differential 10 in accordance with the sensed conditions. A few or a multitude of vehicle drive conditions can be sensed, and many sensors for these conditions are already available in the automotive art for automatic braking systems and load leveling systems. I prefer that sensors include axle acceleration ($S_A$), axle weight distribution ($S_W$), vehicle turning ($S_T$), vehicle velocity ($S_V$), and engine braking ($S_B$), although other conditions can also be sensed. Because a slipping wheel accelerates faster than a wheel retaining traction, acceleration sensors $S_A$ 31 and $S_A$ 32, applied respectively to axles 17 and 18, can detect loss of traction so that rollers 15 can be angled to supply more torque to the wheel maintaining traction. When my CVD is used to divide drive torque between front and rear axles, the acceleration sensors can be applied to drive torque distribution shafts 17 and 18 to determine which pair of axles is slipping so as to direct more of the drive torque to the axle pair having better traction. Weight sensors $S_W$ 33 and $S_W$ 34, applied respectively to axles 17 and 18, can detect a shift in vehicle weight to the outside axle when the vehicle rounds a curve, and this can be used to angle rollers 15 to apply more of the differential torque to that axle. A similar effect can be achieved by a combination of turning sensor $S_T$ 35, sensing the turning angle of the front wheels, and velocity sensor $S_V$ 36 sensing vehicle velocity, which is especially relevant during turning Braking sensor $S_B$ 37 can detect engine braking, to slow the vehicle by use of the engine and drive train, so that if one wheel loses traction and slides during engine braking, rollers 15 can be angled to ensure that more of the torque is exerted by the non-sliding wheel. In four wheel drive vehicles, weight sensors can be used to determine the weight distribution on the front and rear wheels, which can be supplied with proportional drive torque by my CVD.

All of these sensors of vehicle drive conditions, and other sensors that are available or may become desirable, can input to control processor 40, which then has information on the vehicle drive conditions that are relevant to differential torque distribution. Processor 40 is preferably a microprocessor programmed to respond appropriately to the inputs from all the sensors and to drive motor 25 via slip ring 24. This changes the interaxle speed ratio and thus varies the torque bias ratio of any axle differentiation so that the result suits the vehicle's operating circumstances.

The capability of my continuously variable differential for distributing torque independently of the relative speeds of a pair of drive axles offers automotive engineers new design possibilities that have not been previously available. Applying more torque to the faster rotating axle on the outside of a curve, for example, can be done to eliminate under steer moments and possibly improve steering performance. Suspension systems, which have had to accommodate the torque bias ratios characteristic of differentials with fixed speed ratios of −1, can be changed to take advantage of the variable torque distribution that my invention makes possible. Vehicles with automatic braking systems may be able to use sensors that are already in place so that these can contribute to control of torque distribution as well as braking force The many vehicles with an onboard computer, already performing some functions relative to vehicle drive conditions, may be able to expand this technology to control a continuously variable differential according to my invention. Four wheel drive vehicles can use three of my CVD's—one between each axle pair, and one to distribute torque between the axle pairs—allowing torque to be optimally applied to all four wheels, depending on traction, weight distribution, and vehicle turning.

I claim;

1. A continuously variable torque apportioning system for a differential in a motor vehicle drive train having an input element operatively connected to a vehicle power source and a continuously variable transmission that can vary speed ratio throughout a continuum of values, said system comprising:

said transmission including a pair of output elements operatively connected to respective drive shafts, and a housing of said transmission being mounted for rotation in response to rotation of said input element ;

a continuously varaible speed ratio path being rotated with said housing, opposite ends of said speed ratio path being operatively connected with said output elements for rotating said output elements with said housing and said speed ratio path and for permitting counter-directional rotation of said output elements with respect to said housing, variation of said speed ratio throughout said continuum of values being applied within said transmission to said speed ratio path between said output elements;

sensors for sensing conditions affecting operation of said motor vehicle;

a processor for processing information obtained from said sensors on operating conditions of said motor vehicle for determining an apportionment of torque between said output elements appropriate for such operating conditions; and said processor being operatively connected with said transmission for varying said speed ratio of said path between said output elements to effect said apportionment of drive torque between said drive shafts, said drive torque apportionment being an inverse function of said speed ratio and being independent of differential rotation of said drive shafts.

2. The system of claim 1 wherein said apportionment of said drive torque between said drive shaft is effected independently of the speed of said counter directional rotation of said output elements.

3. The system of claim 1 wherein said continuously variable transmission is a traction drive transmission.

4. The system of claim 1 wherein the rotational speed of said housing is maintained within a range defined by the respective rotational speeds of said drive shafts.

5. The system of claim 4 wherein a ratio of differences between said rotational speed of said housing and each of said respective rotational speeds of said drive shafts can be varied throughout a continuum of values, independently of the difference between said respective rotational speeds of said drive shafts.

6. The system of claim 4 wherein the absolute differences between said rotational speed of said housing and each of said respective rotational speeds of said drive shafts can be unequal.

7. The system of claim 6 wherein more of said drive torque is apportioned to the one of said drive shafts having a lesser absolute speed difference from said housing.

8. The system of claim 7 wherein said drive shaft receiving more of said drive torque is rotating faster than said housing and faster than the other of said drive shafts.

9. The system of claim 7 wherein said drive shaft receiving more of said drive torque is rotating slower than said housing and slower than the other of said drive shafts.

10. A method of apportioning differential input torque between output shafts of a differential mounted for rotation in the drive line of a motor vehicle, and said method comprising:

sensing conditions affecting operation of the motor vehicle;

processing information obtained from sensed operating conditions for determining an apportionment of torque between said output shafts appropriate for such operating conditions; and varying the speed ratio between said output shafts with respect to said differential within a continuum of speed ratios to effect said determined apportionment of torque between said output shafts independently of differential rotation of said output shafts.

11. The method of claim 10 including using a continuously variable transmission having a housing and a speed ratio path carried within said housing interconnecting said output shafts for counter directional rotation with respect to said housing and for varying said speed ratio between said output shafts.

12. The method of claim 11 including rotating said housing of said continuously variable transmission with said differential input torque.

13. The method of claim 12 including using a traction drive for said continuously variable transmission.

14. The method of claim 11 including affecting said apportionment of differential input torque between output shafts in inverse proportion to said speed ratio.

15. The method of claim 10 including rotating said differential at a rotational speed within a range defined by the respective rotational speeds of said output shafts.

16. The method of claim 15 including controlling a ratio of absolute differences between the rotational speed of said differential and each of said respective rotational speeds of said output shafts to vary said speed ratio throughout a continuum of values, independently of the difference between said respective rotational speeds of said output shafts.

17. The method of claim 15 including effecting unequal absolute differences between the rotational speed of said differential and each of said respective rotational speeds of said output shafts.

18. The method of claim 17 including apportioning more of said differential input torque to the one of said output shafts having a lesser absolute speed difference from said differential.

19. The method of claim 18 including enabling said one output shaft having a lesser absolute speed difference from said differential to rotate faster than said differential to rotate faster than said differential and faster than the other of said output shafts.

20. The method of claim 18 including enabling said one output shaft having a lesser absolute speed difference from said differential to rotate slower than said differential and slower than the other of said output shafts.

* * * * *

UNITED STATES PATENT OFFICE
CERTIFICATE OF CORRECTION

PATENT NO. : 4,963,122
DATED : Oct. 16, 1990
INVENTOR(S) : Thomas B. Ryan

It is certified that error appears in the above-identified patent and that said Letters Patent is hereby corrected as shown below:

In column 2, line 60, delete "one embodiment" and insert --one preferred embodiment--;

In column 4, lines 48 and 49, delete "axles of rollers" and insert --angles of rollers--;

In column 5, line 19, delete "turning Braking" and insert --turning. Braking--;

In column 5, line 55, delete "braking force The" and insert --braking force. The--;

In column 8, line 22, delete "to rotate faster than said differential".

Signed and Sealed this

Seventh Day of April, 1992

*Attest:*

HARRY F. MANBECK, JR.

*Attesting Officer*     *Commissioner of Patents and Trademarks*